(12) United States Patent
Acker et al.

(10) Patent No.: US 9,061,652 B2
(45) Date of Patent: Jun. 23, 2015

(54) DIFFUSER

(75) Inventors: Dominique Acker, Gschwend (DE); Gerd Zischka, Schwabisch (DE); Stojan Bogdanovic, Schwabisch Gmund (DE); Andreas Loos, Rechberghausen (DE); Jurgen Scherr, Waldstetten (DE)

(73) Assignee: TRW Automotive GmbH, Aldorf (DE)

( * ) Notice: Subject to any disclaimer, the term of this patent is extended or adjusted under 35 U.S.C. 154(b) by 0 days.

(21) Appl. No.: 14/112,614

(22) PCT Filed: Apr. 23, 2012

(86) PCT No.: PCT/EP2012/001731
§ 371 (c)(1),
(2), (4) Date: Nov. 12, 2013

(87) PCT Pub. No.: WO2012/150005
PCT Pub. Date: Nov. 8, 2012

(65) Prior Publication Data
US 2014/0062072 A1 Mar. 6, 2014

(30) Foreign Application Priority Data
May 2, 2011 (DE) .......................... 10 2011 100 236

(51) Int. Cl.
*B60R 21/261* (2011.01)
*B60R 21/262* (2011.01)

(52) U.S. Cl.
CPC .................................. *B60R 21/261* (2013.01)

(58) Field of Classification Search
CPC .......................... B60R 21/261; B60R 21/262
USPC .......................................... 280/736, 740, 742
See application file for complete search history.

(56) References Cited

U.S. PATENT DOCUMENTS

| | | | | |
|---|---|---|---|---|
| 3,476,403 A * | 11/1969 | Richardson | .................... | 280/740 |
| 3,602,526 A * | 8/1971 | Brawn | .......................... | 280/740 |
| 4,178,017 A * | 12/1979 | Ishi et al. | ...................... | 280/740 |
| 5,613,704 A | 3/1997 | White, Jr. et al. | | |
| 5,803,486 A | 9/1998 | Spencer et al. | | |
| 5,918,898 A * | 7/1999 | Wallner et al. | ............. | 280/728.2 |
| 6,149,192 A * | 11/2000 | Swann et al. | ................. | 280/740 |
| 6,336,659 B1 * | 1/2002 | Corrion | ......................... | 280/736 |
| 6,419,266 B1 * | 7/2002 | Morfouace et al. | ........... | 280/740 |
| 6,494,483 B2 * | 12/2002 | Floersheimer et al. | ....... | 280/740 |
| 6,648,366 B2 * | 11/2003 | Dillon et al. | .................. | 280/729 |
| 7,530,598 B2 * | 5/2009 | Fischer et al. | ................ | 280/742 |
| 7,597,351 B2 * | 10/2009 | Kashiwagi | ................. | 280/730.2 |
| 7,618,060 B2 * | 11/2009 | Harvey et al. | ................. | 280/740 |
| 7,770,923 B2 * | 8/2010 | Woo | .............................. | 280/741 |
| 8,448,984 B2 * | 5/2013 | Azuma et al. | ................. | 280/742 |
| 8,820,784 B1 * | 9/2014 | Mayville et al. | .............. | 280/742 |
| 2008/0007035 A1 * | 1/2008 | Acker et al. | ................... | 280/742 |

FOREIGN PATENT DOCUMENTS

EP 0 790 154 8/1997

* cited by examiner

*Primary Examiner* — Paul N Dickson
*Assistant Examiner* — Laura Freedman
(74) *Attorney, Agent, or Firm* — Tarolli, Sundheim, Covell & Tummino LLP

(57) ABSTRACT

In a diffusor (14) for an inflator (10) of an airbag module including an outer wall (16) that encloses the inflator (10) at least in a discharge area (12) in the circumferential direction, wherein the outer wall (16) has a gap edge (18) extending substantially in the longitudinal direction (L) and is bent open along said gap edge (18) upon activation of the inflator (10) and a discharge direction for the gas is defined, it is provided that gas deflecting elements (24, 26) which influence the discharge direction of the gas discharged from the inflator (10) in the bent-open state of the diffusor (14) are provided at the outer wall (16).

14 Claims, 6 Drawing Sheets

DIFFUSER

RELATED APPLICATIONS

This application corresponds to PCT/EP2012/001731, filed Apr. 23, 2012, which claims the benefit of German Application No. 10 2011 100 236.0, filed May 2, 2011, the subject matter, of which is incorporated herein by reference in their entirety.

BACKGROUND OF THE INVENTION

The invention relates to a diffusor for an inflator of an airbag module including an outer wall that encloses the inflator at least in a discharge area in the circumferential direction, wherein the outer wall has a gap edge substantially extending in the longitudinal direction and is bent open along said gap edge upon activation of the inflator and defines a discharge direction for the gas.

Airbag modules include diffusors that serve for influencing the inflating behavior of the airbag and for swirling the gas flowing out of the inflator so as to protect the airbag fabric against direct incident flow of the hot gas. From the state of the art diffusors are known for enclosing the inflator in a discharge area. Upon activation of the inflator they are fully or partially opened by the pressure wave formed. In such opened state the diffusor defines a discharge orifice through which the gas can flow into the airbag. The area of the airbag fabric located behind the diffusor is protected against direct incident flow of the hot gas while the gas flow guided through the discharge orifice is swirled so that the gas is cooled and a uniform pressure increase occurs in the airbag. Although in the diffusors used so far sufficient protection of the fabric located behind the diffusor is provided, the swirl characteristics of these diffusors are insufficient, however, so that the airbag fabric frequently has to be protected by additional protective layers. The gas flow is merely deflected in this case so that the pressure wave of the inflator and the hot gas, respectively, directly impinge on the airbag fabric.

SUMMARY OF THE INVENTION

It is the object of the invention to provide a diffusor for an inflator of an airbag module that permits more efficient swirling and deflection, respectively.

For achieving the object it is provided in a diffusor of the type described in the beginning that at the outer wall gas deflecting elements are provided for influencing the discharge direction of the gas exiting the inflator in the bent-open state of the diffusor. According to the invention, the discharge direction and the discharging gas are not only influenced by the shape of the diffusor in the bent-open state but also by additional gas deflecting elements. They bring about an efficient influence, for example a more directed deflection or a swirl of the gas flow acting in addition to the deflection. The gas deflecting elements can be designed, for example, such that the gas flow is deflected away from the airbag fabric and is additionally swirled. Thus the pressure wave generated by the inflator is weakened so that a uniform pressure increase occurs in the airbag. Moreover the gas is cooled by mixing before it impinges on the airbag fabric. Hence the gas flow does not impinge on the airbag fabric as a directed flow, but uniform pressure increase is attained inside the airbag by the swirling.

The gas deflecting elements can be projections and/or recesses provided on the inside of the diffusor, for example. They form an uneven reflection surface at the inside of the diffusor by which non-directed reflection of the gas flow takes place. Rather, the gas flow is guided in different directions depending on the point of impact on the inside so that efficient swirling is achieved. Through the discharge orifice defined by the diffusor in the bent-open state the swirled gas is guided in the direction of the airbag even during swirling so that the airbag is inflated in a well-directed manner.

The projections and/or recesses have a point shape, for example, e.g. a circular or rectangular shape. The side surfaces of such point-shaped gas deflecting element are designed to descend to different sides so that different angles of reflection are resulting for the impinging gas flow by which excellent swirling is generated.

It is also imaginable, however, that the projections and recesses are formed in line shape and extend in the axial direction especially with respect to the longitudinal direction of the diffusor.

Said line-shaped projections or recesses can be arranged at regular intervals, for example, so that in axial cross-section they form a wave profile.

The projections or recesses can be formed in an especially simple manner by embossing the outer wall. That is to say that the diffusor is made of deformable material and the recesses or projections are individually adapted during a subsequent manufacturing step. Due to such embossing, moreover no additional material has to be applied or removed so as to form the recesses or projections. Since the thickness of the outer wall substantially is not changed during embossing, i.e. after embossing the outer wall substantially has the same thickness all over, the stability of the diffusor is not influenced so that the deformation characteristics correspond to the deformation characteristics of a conventional diffusor especially when bending the diffusor open upon activation of the inflator.

In a preferred embodiment the outer wall is bent radially inwardly at the gap edge. The gas flow usually impinges on the outer wall and is guided substantially along said outer wall in the direction of the discharge orifice and subsequently into the airbag. The radially inwardly bent gap edge once again deflects said gas flow inwardly ahead of the discharge orifice so that the gas flow is additionally swirled before it impinges on the airbag fabric. At the same time part of the gas flow is deflected in the axial direction by said radially inwardly bent gap edge. The wider the radially inwardly bent gap edge, the greater the part of the axially guided gas flow. The part of the axially flowing gas can also be adjusted by the angle of bending. Thus a gas distribution is possible which otherwise can only be obtained by a closed diffusor. Those diffusors can be manufactured more cost-efficiently vis-à-vis closed tubular diffusors.

The gap edge can also have a waveform viewed in the axial direction, wherein such irregular edge entails an additional refraction or scattering of the gas flow.

Alternatively, it is also imaginable that the gas deflecting elements are formed by recesses provided in the outer wall, especially oblong slits or slits extending in the axial direction. A small part of the discharging gas can escape from the diffusor through said slits. The widening behind the slits causes a strong deceleration of the gas flow and thus strong swirling. The slits are preferably designed to be so narrow that only a small part of the gas discharged from the inflator can escape through said slits so that also in this embodiment after activating the inflator a strong increase in pressure occurs by which the diffusor is bent open.

BRIEF DESCRIPTION OF THE DRAWINGS

Further advantages and features are resulting from the following description in combination with the enclosed drawings in which.

DESCRIPTION OF EMBODIMENTS

Figure 1:
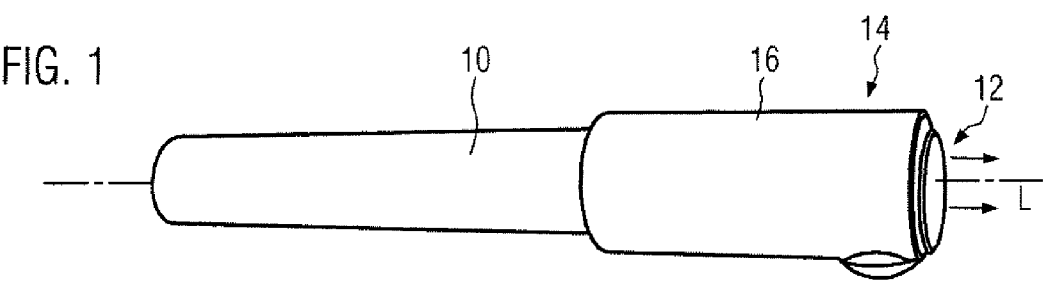
FIG. 1 shows a perspective representation of an inflator from the state of the art.
Figure 2:
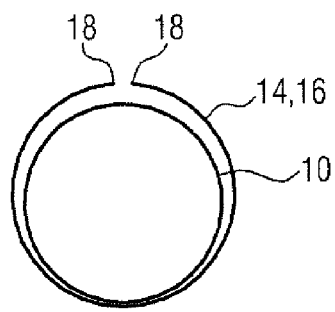
FIG. 2 shows a sectional view across the inflator from FIG. 1 in the area of the diffusor.
Figure 3:
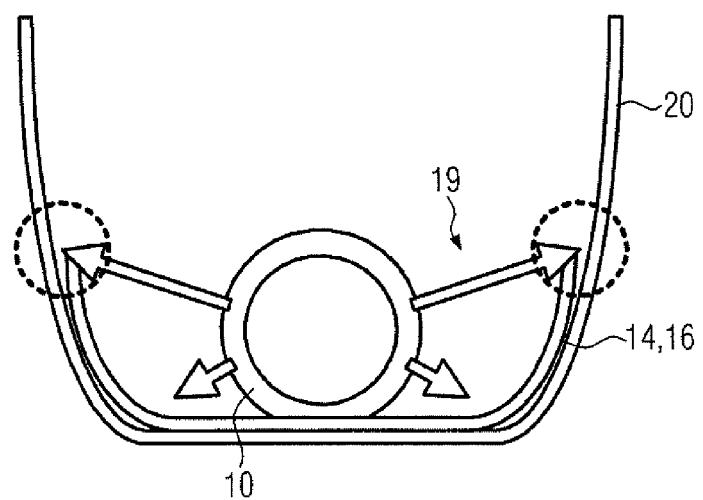
FIG. 3 shows the sectional view from FIG. 2 in the open state of the diffusor, FIGS. 4a) to c) show a first embodiment of a diffusor according to the invention in a perspective representation and a respective sectional view across an inflator with a closed and bent-open diffusor, FIGS. 5a) to c) show a second embodiment of a diffusor according to the invention in a perspective representation and a respective sectional view across an inflator with a closed and bent-open diffusor, FIGS. 6a) to c) show a third embodiment of a diffusor according to the invention in a perspective representation and a respective sectional view across an inflator with a closed and bent-open diffusor, FIGS. 7a) to c) show a fourth embodiment of a diffusor according to the invention in a perspective representation and a respective sectional view across an inflator with a closed and bent-open diffusor.

In FIG. 1 an inflator 10 for an airbag of a vehicle is shown. The inflator 10 has a substantially oblong shape comprising a discharge area 12 arranged on the right with respect to FIG. 1. The discharge area 12 is formed so that the gas can be discharged in the radial direction (cf. also FIG. 3) and in the axial direction (cf. FIG. 1) with respect to the longitudinal axis L of the inflator 10. The discharge area 12 is surrounded by a diffusor 14 in this case having a substantially cylindrical outer wall 16 which completely covers the discharge area 12 of the inflator 10 in the axial direction and encloses the latter in the radial direction (cf. FIG. 2). The inflator 10 is arranged inside an airbag 20 at least with the discharge area 12 and the diffusor 14 surrounding the latter so as to fill the airbag with gas upon activation of the inflator (FIG. 3).

When the inflator 10 is activated, the gas generated by the inflator 10 is discharged through the discharge area 12 in the axial and radial directions. Due to the pressure wave formed in this way the diffusor 14, or due to the pressure increase inside the diffusor 14, the outer wall 16 is bent open away from the gap edge 18.

In said bent-open state the diffusor 14 forms a dished trough defining a discharge orifice 19 through which the gas can flow into the airbag 20. As is evident especially in FIG. 3, part of the discharging gas impinges on the bent-open diffusor 14 and is deflected by the same. The gas discharged downwards and laterally from the inflator with respect to FIG. 3 impinges on the outer wall 16 and is deflected toward the discharge orifice 19. The fabric located beneath or behind the outer wall 16 is thus protected against the direct pressure wave of the gas discharged from the airbag 20, as the gas is deflected upwards into the airbag 20. The pressure wave is weakened by bending the diffusor 14 open so that a more uniform increase in pressure occurs in the airbag. Since the gas flow escapes from the diffusor in an upwardly directed manner, protective measures have to be taken for protecting the fabric in the area where the gas flow impinges on the airbag fabric. For this purpose, usually additional protective layers are provided on the inside of the airbag 20.

For further reducing the loads on the airbag fabric, according to the invention gas deflecting elements are provided at the diffusor 14 and, respectively, at the outer wall 16 of the diffusor 14. On the one hand, they bring about an additional deflection of the gas flow, wherein the shape and the arrangement of the gas deflecting elements prevent a directed gas flow. On the other hand, the gas flow is swirled more efficiently by said gas deflecting elements, as will be explained in the following, so that no directed pressure wave impinges on the airbag fabric, but a more uniform pressure increase is caused in the airbag 20. In addition, such swirling results in cooling of the hot gas.

Figure 4A:
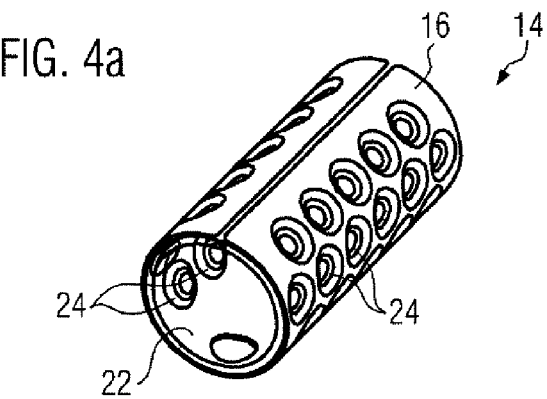
Figure 4B:
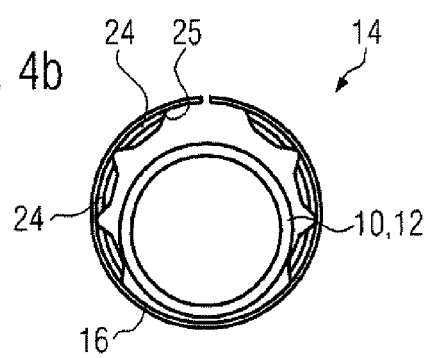
Figure 4C:
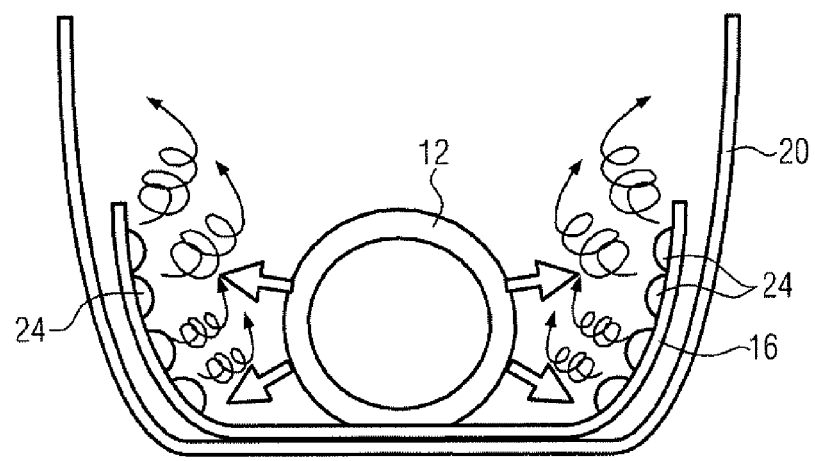

In a first embodiment shown in FIGS. 4a) to c) the gas deflecting elements are constituted by inwardly protruding projections 24 distributed on the inside 22 of the outer wall 16. The projections 24 are formed by embossing and are substantially point-shaped. Due to said projections 24 the inside 22 of the diffusor 14 includes an uneven reflection surface. Depending on the point of impingement of the gas flow, an irregular deflection of the gas flow takes place by the tapered peripheral surface 25 of the projections 24. The irregular reflection entails very efficient swirling so that the gas flow is thoroughly mixed and a directed gas flow onto the airbag fabric is prevented from occurring. Due to the increasing pressure in the diffusor 14, the swirled gas flow rises along the outer wail 16 and, after escaping from the discharge orifice 19, along the inner airbag wall, thereby ensuring uniform deployment of the airbag 20 by the uniform increase in pressure. The form of the point-shaped projections 24 or recesses can be adapted at will. They can have a spherical, conical or pyramidal shape, for example.

Figure 5A:
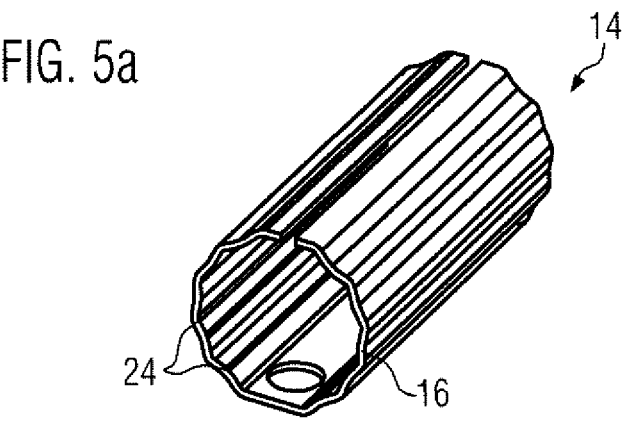
Figure 5B:
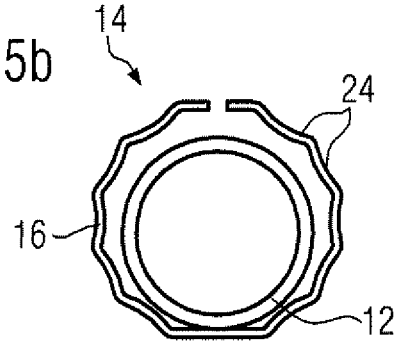
Figure 5C:
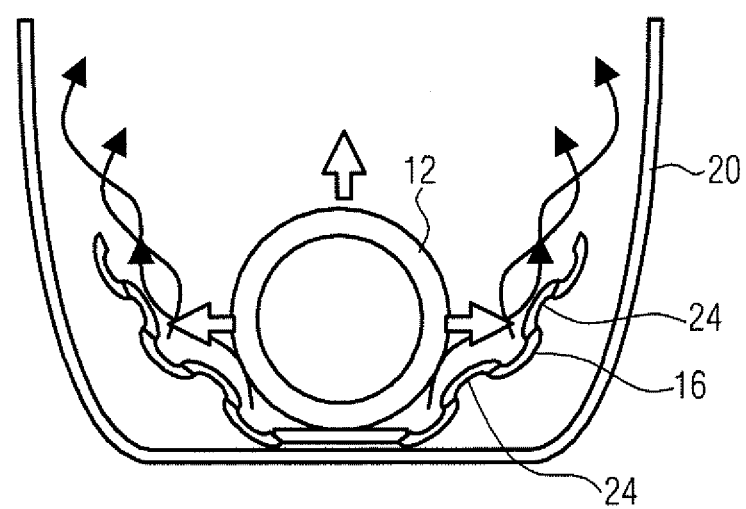

In the embodiment shown in FIGS. 5a) to c) the gas deflecting elements are formed by line-shaped projections 24 extending in axial direction with respect to the longitudinal axis L of the diffusor. As is evident especially in FIGS. 5b) and c), said line-shaped recesses are equally produced by embossing, the projections 24 forming a wave profile viewed in axial cross-section. As is evident in FIG. 5c), the gas flow of the inflator is reflected also in this embodiment by the inner wall of the diffusor, wherein a swirled upwardly directed gas flow is formed due to the angles of impact varied by the wave profile. The wave profile is configured so that after swirling the gas flow is deflected upwardly with respect to FIG. 5c) and rises along the airbag wall.

Figure 6A:
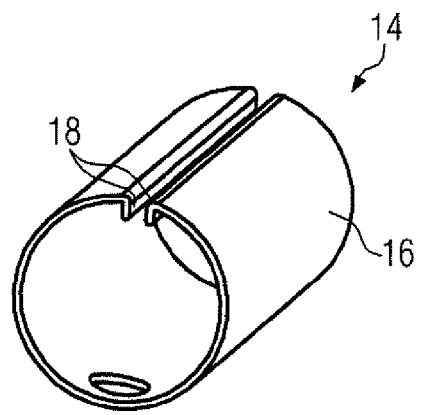
Figure 6B:
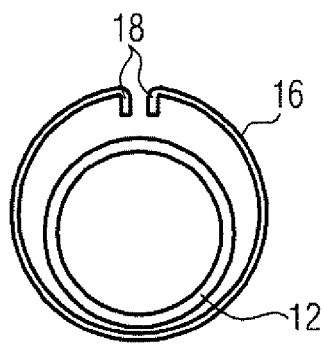
Figure 6C:
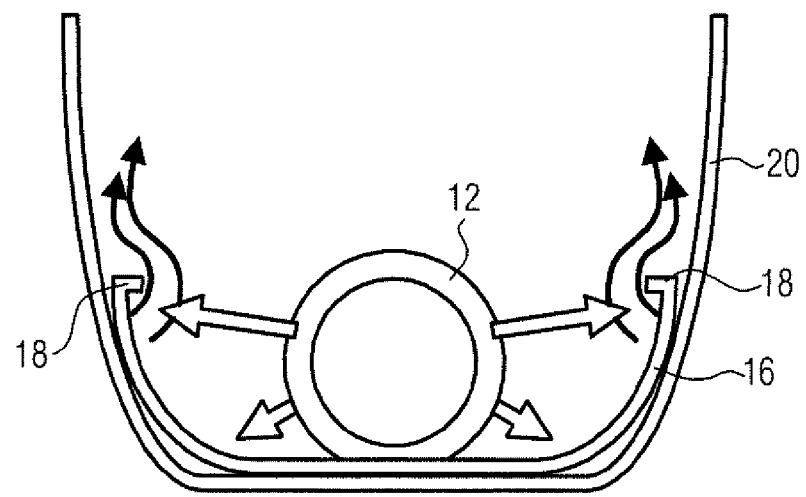

In the embodiment illustrated in FIGS. 6 a) to c) the outer wall 16 of the diffusor 14 has a substantially planar shape. The gas deflecting elements in this case are formed at the gap edge 18 in that the latter is bent radially inwardly. Usually the gas discharged from the inflator 10 would impinge of the inside of the diffusor 14 and would be deflected by the same so that the gas flows along the inside of the diffusor upwardly into the airbag 20 (cf. e.g. also FIG. 5 c). The radially inwardly bent gap edge 18 deflects the gas flow radially inwardly ahead of the discharge orifice 19 (cf. FIG. 6 c) so that the gas flow mixes with or is swirled with the gas exiting to the top. Thus also the gas upwardly discharged from the inflator is swirled.

Figure 7A:
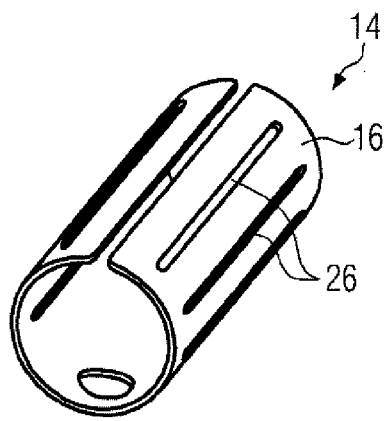
Figure 7B:
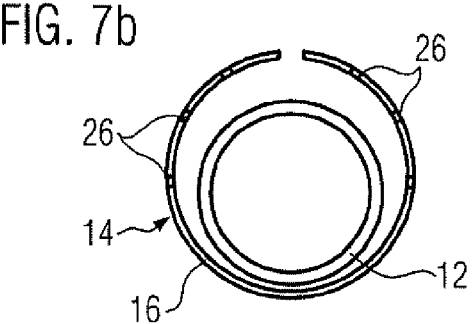
Figure 7C:
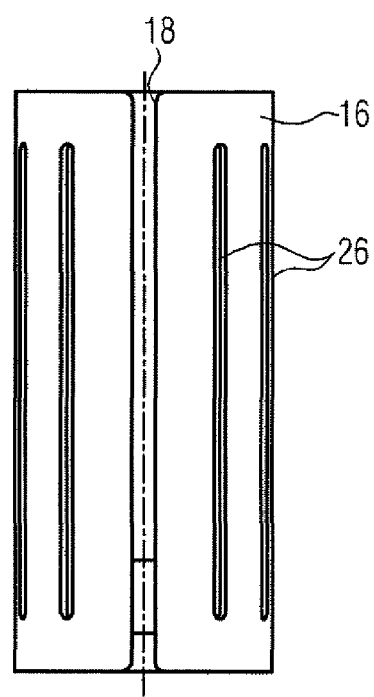

In the embodiment shown in FIGS. 7a) to c) the gas deflecting elements are formed by slits 26 extending in the longitudinal direction L. Said slits 26 are so narrow that only a small part of the gas discharged from the inflator can flow through said slits. As the space behind the slits 26 is strongly expanded, the gas flow exiting through the slits 26 is strongly decelerated and also strongly swirled behind the slits 26. Upon activation of the inflator 10, the diffusor 14 is bent open due to the increasing pressure despite the slits 26 so that the diffusor is dished.

Figure 8:
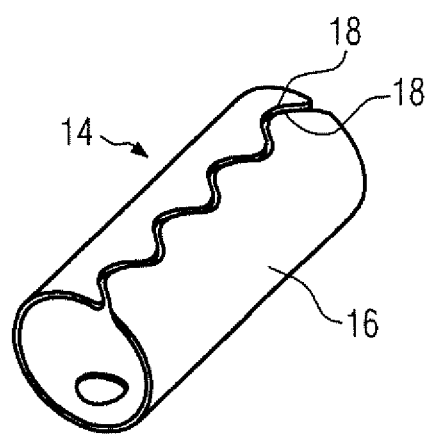
FIG. 8 shows a fifth embodiment of a diffusor according to the invention in a perspective representation.

In the embodiment shown in FIG. 8 the swirling effect is additionally increased by an undulated gap edge 18 which serves as a refractive edge for the outflowing gas.

The embodiments shown here can also be combined with each other so as to produce a particular influence of the gas flow. It is imaginable, for instance, that the diffusor 14 includes both recesses and projections 24, resp., and an inwardly bent gap edge 18.

The invention claimed is:

1. A diffusor (14) for an inflator (10) of an airbag module including an outer wall (16) enclosing the inflator (10) at least in a discharge area (12) in a circumferential direction (U), wherein the outer wall (16) has gap edges (18) substantially extending in a longitudinal direction (L) along an entire length of the outer wall (16) and is bent open along said gap edges (18) upon activation of the inflator (10) and defines a discharge direction for gas, the gap edges (18) having a substantially constant circumferential spacing from one another along the entire length of the diffusor (14),
wherein gas deflecting elements (24, 26) are provided at the outer wall (16) for influencing the discharge direction of the gas discharged from the inflator (10) in the bent-open state of the diffusor (14),
and wherein the gas deflecting elements (24, 26) are projections (24) and/or recesses provided on an inside of the outer wall (16).

2. The diffusor according to claim 1, wherein the projections (24) and/or the recesses are point-shaped.

3. The diffusor according to claim 1, wherein the projections (24) and/or the recesses are line-shaped and extend in an axial direction with respect to the longitudinal direction of the diffusor (14).

4. The diffusor according to claim 3, wherein the projections (24) and/or the recesses form a wave profile viewed in an axial cross-section.

5. The diffusor according to claim 1, wherein the projections (24) and/or the recesses are formed by embossing the outer wall (16).

6. The diffusor according to claim 1, wherein the gap edges (18) have a waveform viewed in an axial direction.

7. The diffusor according to claim 1, wherein the recesses comprise oblong slits (26) extending in an axial direction and provided at the outer wall (16) such that the oblong slits (26) extend radially through the entire outer wall (16).

8. The diffusor according to claim 1, wherein the outer wall (16) has a substantially cylindrical shape and is substantially dished in the bent-open state.

9. The diffusor according to claim 1, wherein the outer wall (16) has a substantially C-shaped axial cross-section prior to activation of the inflator (10).

10. The diffusor according to claim 1, wherein the outer wall (16) has the same length in the longitudinal direction (L) prior to and upon activation of the inflator (10).

11. The diffusor according to claim 1, wherein the outer wall (16) is substantially U-shaped in the bent-open state.

12. A diffusor (14) for an inflator (10) of an airbag module including an outer wall (16) enclosing the inflator (10) at least in a discharge area (12) in a circumferential direction (U), wherein the outer wall (16) has a single gap edge (18) substantially extending in a longitudinal direction (L) along an entire length of the outer wall (16) and is bent open along said gap edge (18) upon activation of the inflator (10) and defines a discharge direction for gas, the outer wall (16) being bent radially inwardly at the gap edge (18),
wherein gas deflecting elements (24, 26) are provided at the outer wall (16) for influencing the discharge direction of the gas discharged from the inflator (10) in the bent-open state of the diffusor (14),
and wherein the gas deflecting elements (24, 26) are projections (24) and/or recesses provided on an inside of the outer wall (16).

13. A diffusor (14) for an inflator (10) of an airbag module including an outer wall (16) enclosing the inflator (10) at least in a discharge area (12) in a circumferential direction (U), wherein the outer wall (16) has a single gap edge (18) substantially extending in a longitudinal direction (L) along an entire length of the outer wall (16) and is bent open along said gap edge (18) upon activation of the inflator (10) and defines a discharge direction for gas,
wherein gas deflecting elements (24, 26) are provided at the outer wall (16) for influencing the discharge direction of the gas discharged from the inflator (10) in the bent-open state of the diffusor (14),
wherein the gas deflecting elements (24, 26) comprise inwardly protruding circular projections (24) provided on an inside of the outer wall (16) that are free from openings.

14. A diffusor for an inflator of an airbag module comprising:
an outer wall enclosing the inflator at least in a discharge area, the outer wall extending continuously about an axis from a first edge extending in a longitudinal direction of the inflator to a second edge extending parallel to the first edge and extending in the longitudinal direction, both the first edge and the second edge extending an entire length of the diffusor, the outer wall being bent open along the first and second edges upon activation of the inflator to define a discharge direction for gas,
wherein gas deflecting elements are provided at the outer wall for influencing the discharge direction of the gas discharged from the inflator in the bent-open state of the diffusor, the gas deflecting elements being projections and/or recesses provided on an inside of the outer wall.

* * * * *